(12) United States Patent
Imai et al.

(10) Patent No.: US 10,021,348 B1
(45) Date of Patent: Jul. 10, 2018

(54) CONFERENCING SYSTEM, DISPLAY METHOD FOR SHARED DISPLAY DEVICE, AND SWITCHING DEVICE

(71) Applicant: LENOVO (SINGAPORE) PTE. LTD., Singapore (SG)

(72) Inventors: Takumi Imai, Yokohama (JP); Kazuhiro Kosugi, Yokohama (JP); Daisaku Morita, Yokohama (JP); Nozomi Mandokoro, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 15/714,774

(22) Filed: Sep. 25, 2017

(30) Foreign Application Priority Data

Jul. 21, 2017 (JP) .................................. 2017-141856

(51) Int. Cl.
*H04N 7/14* (2006.01)
*H04N 7/15* (2006.01)
*H04L 29/06* (2006.01)

(52) U.S. Cl.
CPC ............... *H04N 7/15* (2013.01); *H04N 7/147* (2013.01); *H04L 65/403* (2013.01); *H04N 7/142* (2013.01); *H04N 7/155* (2013.01)

(58) Field of Classification Search
CPC .......... H05N 7/15; H05N 7/147; H05N 7/155; H04L 65/403
USPC ...................................................... 348/14.07
See application file for complete search history.

(56) References Cited

U.S. PATENT DOCUMENTS

| | | | | |
|---|---|---|---|---|
| 7,231,402 | B2 * | 6/2007 | Dickens | H04N 5/268 |
| 8,024,760 | B2 * | 9/2011 | Dickens | H04N 5/268 |
| | | | | 345/168 |
| 8,463,961 | B2 * | 6/2013 | Dickens | H04N 5/268 |
| | | | | 710/2 |
| 8,968,090 | B2 * | 3/2015 | Steil | G07F 17/3211 |
| | | | | 463/30 |
| 9,338,483 | B2 * | 5/2016 | Itakura | H04N 21/236 |
| 2003/0035049 | A1 * | 2/2003 | Dickens | H04N 5/268 |
| | | | | 348/100 |
| 2004/0070579 | A1 * | 4/2004 | Kurihara | G09G 3/2011 |
| | | | | 345/204 |

(Continued)

FOREIGN PATENT DOCUMENTS

| | | |
|---|---|---|
| JP | 05232910 A | 9/1993 |
| JP | 2005149440 A | 6/2005 |
| WO | 03065720 A1 | 8/2003 |

*Primary Examiner* — Khai N Nguyen
(74) *Attorney, Agent, or Firm* — Shimokaji IP

(57) ABSTRACT

A conferencing system configured to make it easy to switch video data to be displayed on a shared display device. Multiple client devices are connected to a switching device directly or via a network. The output of the switching device is connected to a shared display device. Each client device outputs, to the switching device, video data used for a presentation. The switching device registers, in a queue, the order of displaying received video data on the shared display device. The registered order can be the order of receiving video data at the switching device. The content of the queue and the allocated time of each presenter can be displayed on the shared display device. The switching device switches video data to be displayed on the shared display device at a predetermined timing according to the order of the queue.

16 Claims, 9 Drawing Sheets

(56) References Cited

U.S. PATENT DOCUMENTS

| | | | | |
|---|---|---|---|---|
| 2005/0046748 A1* | 3/2005 | Ellett | ............... | H04N 5/268 348/705 |
| 2006/0114844 A1* | 6/2006 | Zhu | ............... | H04L 29/06027 370/260 |
| 2006/0248100 A1* | 11/2006 | Dickens | ............... | H04N 5/268 |
| 2007/0022234 A1* | 1/2007 | Yang | ............... | G06F 3/023 710/62 |
| 2007/0206122 A1* | 9/2007 | Dickens | ............... | H04N 5/268 348/705 |
| 2008/0074343 A1* | 3/2008 | Sasser | ............... | G06F 3/14 345/1.1 |
| 2009/0102798 A1* | 4/2009 | Fujita | ............... | G06F 3/023 345/168 |
| 2010/0013759 A1* | 1/2010 | Wu | ............... | G06F 3/1415 345/156 |
| 2010/0180055 A1* | 7/2010 | Lyon | ............... | G06F 3/023 710/62 |
| 2012/0262360 A1* | 10/2012 | Day | ............... | G06F 3/1423 345/1.1 |
| 2013/0194376 A1* | 8/2013 | Tseng | ............... | H04N 7/15 348/14.08 |
| 2014/0087873 A1* | 3/2014 | Steil | ............... | G07F 17/3211 463/31 |
| 2015/0104147 A1* | 4/2015 | Kosaka | ............... | G06F 17/30784 386/239 |
| 2015/0253954 A1* | 9/2015 | Steil | ............... | G07F 17/3211 463/31 |
| 2015/0304366 A1* | 10/2015 | Bader-Natal | ............... | H04L 65/1096 348/14.03 |
| 2015/0312598 A1* | 10/2015 | Itakura | ............... | H04N 21/236 725/117 |
| 2016/0224209 A1* | 8/2016 | Takeda | ............... | G06F 3/04817 |
| 2017/0093933 A1* | 3/2017 | Bader-Natal | ............... | H04L 65/1096 |
| 2017/0302795 A1* | 10/2017 | Wolzien | ............... | H04L 65/1096 |
| 2017/0316640 A1* | 11/2017 | Steil | ............... | G07F 17/3211 |

* cited by examiner

CONFERENCING SYSTEM, DISPLAY METHOD FOR SHARED DISPLAY DEVICE, AND SWITCHING DEVICE

FIELD OF THE INVENTION

The present invention relates to a technique for sharing a shared display device among multiple client devices, and further to a technique for switching video data to be displayed on the shared display device.

BACKGROUND OF THE INVENTION

In a conference room, one large-size shared display device may be shared among client devices held by multiple users, respectively. In this situation, a participant in a distant place can also display an image on the shared display device using an online conferencing system. The shared display device displays an image sent from a client device of a user as a presenter. After completion of a presentation of the first presenter, the shared display device displays an image sent from a client device of the next presenter. At this time, images to be displayed on the shared display device need to be switched in association with the change in presenter.

Patent Document 1 teaches that images being respectively displayed on multiple computers are displayed on a shared display concurrently in a window format. Patent Document 2 discloses a video conferencing system including a video switching mechanism for use in a group conference among multiple terminal devices connected to a multipoint control unit (MCU). This document teaches that the MCU analyzes audio streams to decide on a speaker high in priority in order to forward a video stream of the speaker to all participants.

Patent Document 3 teaches that information sources are switched according to the direction of a display without any selection operation. This document teaches that information sources to be displayed on a display are switched depending on the angle of a stand of a display device. Non-Patent Document 1 teaches a solution to sharing a screen among multiple clients using a display installed in a conference room. This document teaches that the screen is switched by clicking on the screen of a client and a content is shared.

[Patent Document 1] Japanese Patent Application Laid-Open No. 2005-149440
[Patent Document 2] Published Japanese Translation of PCT application No. 2005-516557
[Patent Document 3] Japanese Patent Application Laid-Open No. H05-232910
[Non-Patent Document 1] "Intel Unite Solution User Guide v3.15," [online], Intel, [searched on May 18, 2017], the Internet <URL: http://download.intel.com/support/software/applications/unite/sb/intel_unite_user_guide.pdf>

SUMMARY OF THE INVENTION

In a conferencing system of Non-Patent Document 1, when a client device conducts a sharing operation, image data displayed on a desktop screen of the client device are displayed on a shared display device. When certain image data are being displayed on the shared display device, if another user further sends image data, the screen will be divided to display image data of the previous user and the new user concurrently. In this case, when either of the users carries out an operation to leave the shared display device, the remaining image data are enlarged and displayed. In order to display image data on the shared display device, users are required to carry out sharing operations during a conference.

Further, since image data being currently displayed and image data displayed after a user leaves the shared display device are independent of the order of presentations, it may be hard to use this system at a conference where the order of presentations is predetermined. Further, in order for a client device of a remote user to display image data on the shared display device using an online conferencing system, any one of local users participating in the conference is required to conduct a relay operation, taking a lot of trouble. In addition, the remote user cannot share image data being displayed on the shared display device. It is an object of the present invention to solve various problems with a conferencing system including such a shared display device.

According to one aspect of the present invention, there is provided a method in which a switching device displays, on a shared display device, video data output from multiple client devices. Receiving video data from the multiple client devices, the switching device sets the order of displaying plural pieces of video data on the shared display device, and switches and displays video data on the shared display device according to the set order.

The display order can be the order of receiving video data at the switching device, or the order designated by each client device along with output of the video data. The switching device can display the set order on the shared display device, and change the set order according to an instruction from any one of the client devices. The switching device can set an allocated time to be displayed on the shared display device for each piece of video data, and switch and display video data when the allocated time has passed.

The switching device can measure the time of displaying a predetermined piece of video data, and display the remaining allocated time on the shared display device. The client devices can include a distant client device connected through an online conferencing system. Further, the switching device can send the distant client device video data being displayed on the shared display device.

The above-described aspect of the present invention can make it easy to switch video data to be displayed on the shared display device. The above-described aspect of the present invention can also display video data on the shared display device automatically in predetermined order. Further, the above-described aspect of the present invention can display video data from a remote user on the shared display device without local user intervention.

DETAILED DESCRIPTION OF THE INVENTION

[Outline of Video Sharing System]

Figure 1:
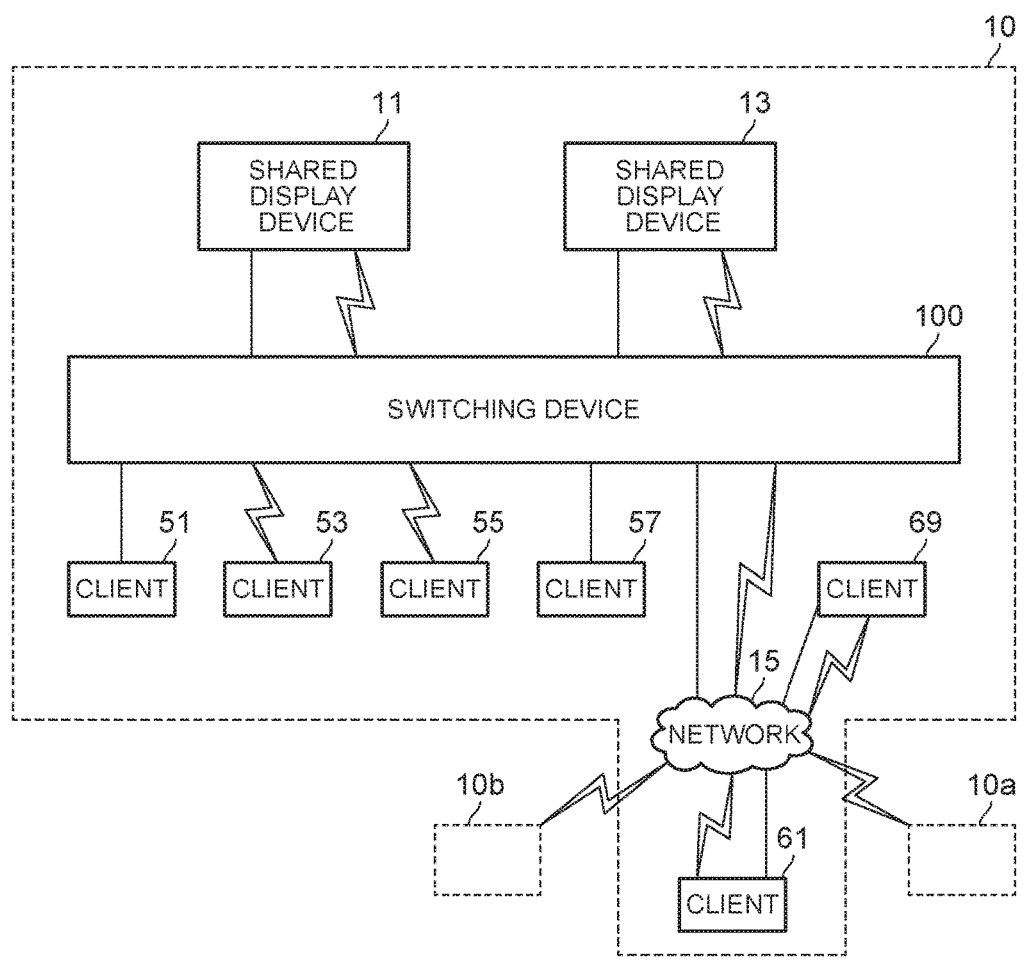
FIG. 1 is a diagram for describing an outline of a video sharing system 10.

FIG. 1 is a diagram for describing an outline of a video sharing system 10 according to an embodiment. In FIG. 1, the video sharing system 10 includes shared display devices 11 and 13, a switching device 100, and client devices 51 to 59 used by local users, which exist in a conference room, and a client device 61 used by a remote user existing outside the conference room 10.

The shared display devices 11 and 13 can be television sets or projectors suitable in size for all local users to view. The number of shared display devices 11, 13 is just an example, and it may be one, or three or more. When there are two or more shared display devices, one presenter can display different image data simultaneously. The shared display devices 11, 13 and the switching device 100 are connected in a wireline or wireless broadband interface standard suitable for transferring video data.

The switching device 100 sets the order of displaying, on the shared display devices 11 and 13, video data output respectively from the client devices 51 to 61 to automatically switch video data to be displayed at predetermined timing. Note that the term "video" used in this specification includes a case of indicating both video and sound, and a case of indicating only a still image. The configuration of the switching device 100 will be described with reference to FIG. 2 and FIG. 3.

The client devices 51 to 61 can be desktop PCs, laptop PCs, tablet terminals, and smartphones. In the embodiment, the client devices 51 to 61 implement software to output video data or control commands to the switching device 100 and receive video data from the switching device 100, but it is not necessary to particularly change the hardware of the client devices.

The client devices 51 to 61 can output, to the switching device 100, video data displayed on each desktop screen or video data of a file selected from its own storage unit or a server. The video data may be video data shot with a camera mounted on each of the client devices 51 to 61. In order to display different video data on the shared display devices 11 and 13, respectively, the client devices 51 to 61 may output two kinds of video data. Each of the client devices 51 to 61 can output a control command to set the order of and the allocated time for presentation when outputting video data or at any timing.

The client devices 51 to 57 are connected to the switching device 100 directly through wired or wireless transmission channels. A network 15 is connected to the switching device 100 through a wired or wireless transmission channel. The client device 59, other video sharing systems 10a, 10b, and the client device 61 are connected to the switching device 100 via the network 15.

In the embodiment, the video sharing systems 10a, 10b can be described to have the same configuration as that of the video sharing system 10. The switching devices in the video sharing systems 10, 10a, and 10b can be connected to one another via the network 15. The network 15 includes any one or more of networks, such as PAN (Personal Area Network), LAN (Local Area Network), MAN (Metropolitan Area Network), WAN (Wide Area Network), the Internet, and an intranet.

Connection devices (not illustrated), like a wireless LAN router, a wireless WAN base station in a mobile communication standard such as 3G, LTE, or WiMAX, and an Ethernet (registered trademark) router, to connect the client devices 55, 57, 59, 61 and the switching device 100 by cable or wirelessly are connected to the network 15. The client device 61 can communicate with the client device 59 using an online conferencing system.

In this case, the client device 59 can send the switching device 100 video data received from the client device 61 to display the video data on the shared display devices 11 and 13. Further, the switching device 100 can display, on the client device 59, video data displayed on the shared display devices 11 and 13. In this case, the client device 61 can receive the video data displayed on the shared display devices 11 and 13 via the client device 59.

As the online conferencing system, there is Skype (registered trademark) for Business, WebEx (registered trademark), or the like. However, in terms of the application of the present invention, there is no need to limit the online conferencing system to a particular one. In addition, in the embodiment, the client device 61 of a remote user can output video data directly to the switching device 100, and further receive, from the switching device 100, video data displayed on the shared display devices 11 and 13 to display the video data on its own display panel. Thus, the remote user can participate in a conference using the screens of the shared display devices 11 and 13 like the local users.

[Switching Device]

Figure 2:
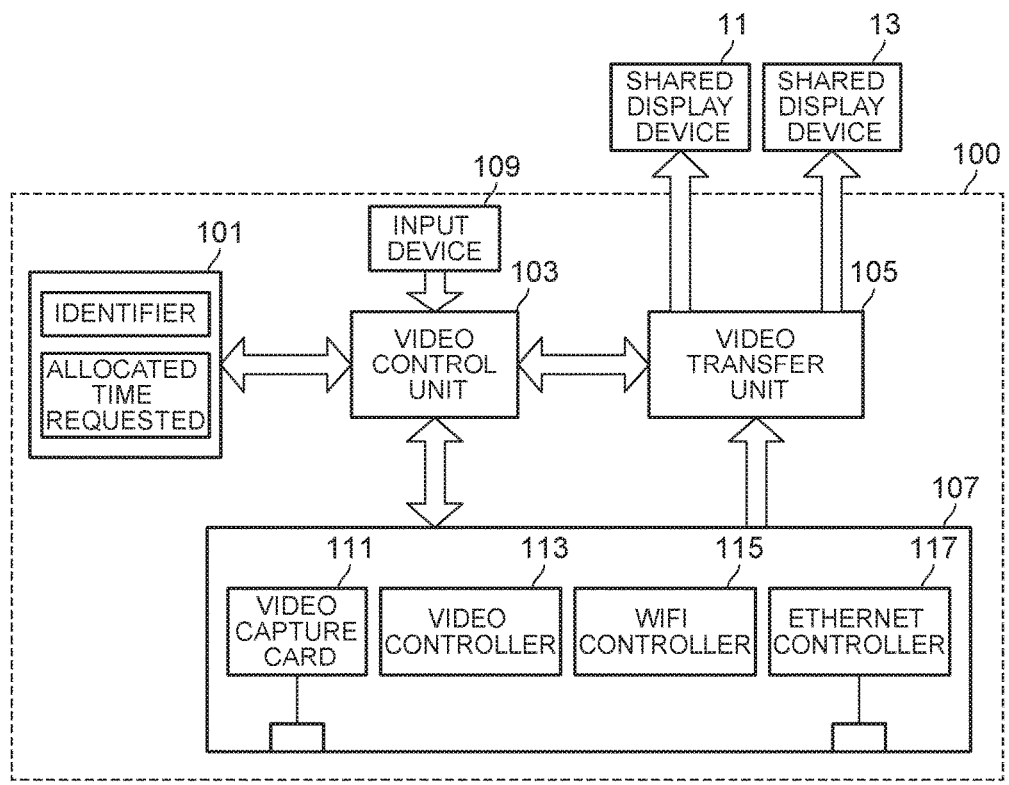
FIG. 2 is a functional block diagram of a switching device 100.

FIG. 2 is a functional block diagram of the switching device 100. The switching device 100 includes a FIFO memory 101, a video control unit 103, a video transfer unit 105, an input interface 107, and an input device 109. The video control unit 103 and the video transfer unit 105 are implemented in hardware, such as a CPU, a system memory, and an I/O chip, in cooperation with software. The FIFO memory 101 can be some memory areas of the system memory accessible by the CPU or a dedicated volatile memory.

In an example, the input interface 107 includes a video capture card 111, a video controller 113, a WiFi (registered trademark) controller 115, and an Ethernet (registered trademark) controller 117. The input interface 107 may further include a WUSB controller usable for communicating with each client device to transmit a control command, a Bluetooth (registered trademark) controller, and the like, all of which are not illustrated.

The video capture card 111 is a wired interface in a video standard, such an HDMI (registered trademark: High-Definition Multimedia Interface), DP (Display Port), VGA (Video Graphics Array), or DVI (Digital Visual Interface), to communicate with the client device 51 and receive video data from the client device 51. The number of provided connectors may be plural depending on the video standard.

The video controller 113 communicates with the client device 53 in a broadband wireless standard, such as WiGig (registered trademark: Wireless Gigabit), WiDi (Intel Wireless Display), Wireless HD (registered trademark), WHDI (registered trademark: Wireless Home Digital Interface), or Miracast (registered trademark) to receive video data. The WiFi (registered trademark) controller 115 communicates with the client device 55 and the network 15 to exchange video data. The Ethernet (registered trademark) controller 117 communicates with the client device 57 and the network 15 to exchange video data.

The switching devices in the video sharing systems 10a, 10b are connected to the switching device 100 via the network 15 to transfer video data and control commands to one another. The input device 109 can be composed of a touch panel, a mouse, a touch screen, and the like. The input device 109 can further include a microphone and a camera to send a remote user sound and images in a place where local users conduct a conference. An administrator can send a control command to the video control unit 103 using the input device 109. The configuration of the video transfer unit 105 will be described with reference to FIG. 3.

[Video Transfer Unit]

Figure 3:
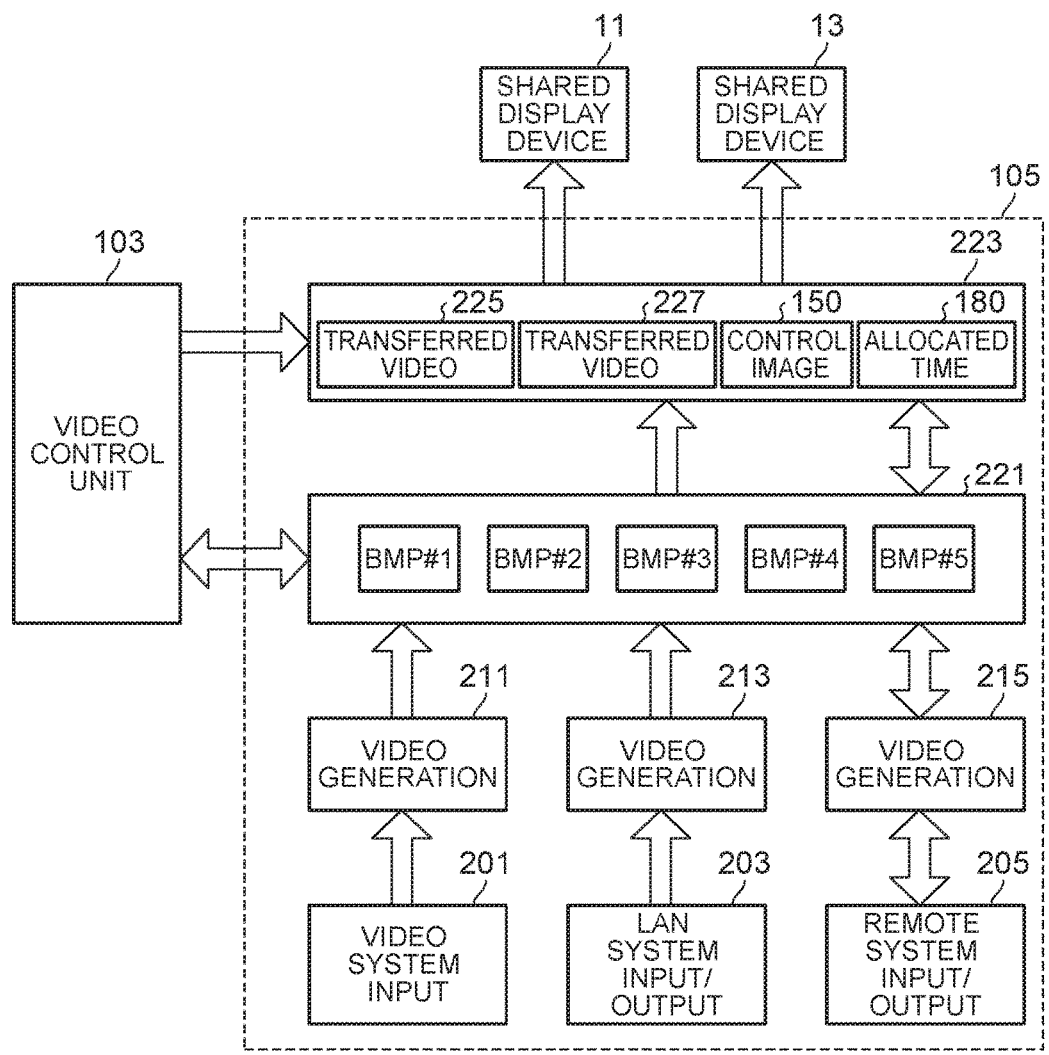
FIG. 3 is a functional block diagram for describing the configuration of a video transfer unit 105.

FIG. 3 is a functional block diagram for describing the configuration of the video transfer unit 105. Each of software modules, which configures each of elements of the video transfer unit 105, can be implemented by a device driver, an OS, and an application program. The configuration in FIG. 3 is just an illustrative example, and it is free to further divide each element or integrate elements. A video system input section 201 receives video data from the video capture card 111 and the video controller 113.

A LAN system input/output section 203 causes the WiFi (registered trademark) controller 115 and the Ethernet (registered trademark) controller 117 to send and receive video data and control commands. A remote system input/output section 205 causes the WiFi (registered trademark) controller 115 and the Ethernet (registered trademark) controller 117 to send and receive video data and control commands for an online conference in which the client device 61 participates. Note that video data from the client device 61 when the client device 59 relays the online conference to display the video data are received by the LAN system input/output section 203.

Since video data respectively received by the video system input section 201, the LAN system input/output section 203, and the remote system input/output section 205 are subjected to rendering, such as RGB and YUV rendering, and pixel-level expansion, the video data may be compressed using various algorithms. Video generation sections 211, 213, and 215 perform decoding of received video data as needed and format conversion between RGB and YUV to generate video data to be displayed on the shared display devices 11 and 13.

As an example, the video generation section 215 includes a software module developed by Skype (registered trademark) for Business SDK. The video generation section 215 sends video data displayed on the shared display devices 11 and 13 to the client device 61 via the network 15 while the client device 61 of the remote user is connected. In this case, the video control unit 103 can send the client device 61 sound in the conference room at the same time.

In an example, each of the video generation sections 211 to 215 stores video data, received from each of the client devices 51 to 61 and the switching devices of the other video sharing systems 10a, 10b, in some areas reserved in part of the system memory as each memory DC 221 in BMP format. For example, the video generation section 211 stores BMP#1 and #2, the video generation section 213 stores BMP#3 and #4, and the video generation section 215 stores BMP#5. The video generation sections 211 to 215 can update the memory DC 221 when received still image data are updated. When receiving video, the video generation section 211 to 215 can rewrite video data in the memory DC 221 at a predetermined refresh rate.

A video synthesis section 223 extracts, from the memory DC 221, video data output from a client device indicated by the video control unit 103, and displays the video data in an indicated format on the shared display device 11, 13 indicated by the video control unit 103. Here, among video data output from the client devices 51 to 61, video data to be displayed on the shared display device 11, 13 are called transferred video. The transferred video corresponds to video data selected by the video control unit 103 from the memory DC 221 based on the queue in the FIFO memory 101 as being displayed on the shared display device 11, 13.

For example, the video synthesis section 223 can output transferred video 225 to the shared display device 11, and transferred video 227 to the shared display device 13. The video synthesis section 223 outputs transferred video from the indicated client devices to the shared display devices 11 and 13 until an instruction to switch to new transferred video is given from the video control unit 103. The video synthesis section 223 can synthesize and output the extracted, transferred video and the remaining allocated time for presentation to the shared display devices 11 and 13.

The video control unit 103 instructs the video synthesis section 223 to create a control image 150 (FIG. 4) based on the queue. When receiving an instruction from the video control unit 103 to display the control image 150 or when switching between transferred videos, the video synthesis section 223 can display, as an example, the control image 150 for a predetermined time period in a manner to be superimposed on transferred video currently being displayed.

[Video Control Unit and FIFO Memory]

The video control unit 103 registers a queue in the FIFO memory 101 in the order in which the video transfer unit 105 receives video data from the client devices 51 to 61 and the video sharing systems 10a, 10b, or in the order designated by the client devices 51 to 61 and the video sharing systems 10a, 10b. The queue corresponds to a data structure including the identifiers of the client devices 51 to 61 and the video sharing systems 10a, 10b from which video data are output, and an allocated time for presentation requested from each user. Note that the queue may not include the allocated time.

The identifier when video data are received from the video capture card 111 can be an input port number. After the control image 150 created based on the registered queue is displayed on the shared display device 11, 13, each of users of the client devices 51 to 61 and the video sharing systems 10a, 10b can send a control command to change the order of the queue or the allocated time.

In accordance with an instruction from any user or an administrator, the video control unit 103 can change the order of the queue in the FIFO memory 101 or change the allocated time based on the control command received from each of the client devices 51 to 61 or the input device 109. Each of the client devices 51 to 61 and the switching devices of the video sharing systems 10a, 10b can send the control command to the video control unit 103 through the input interface 107 concurrently with video data or at any timing. The video control unit 103 can allocate a default allocated time to each of the client devices from which the allocated time is not requested.

When the queue in the FIFO memory 101 is updated, the video control unit 103 can instruct the video synthesis section 223 to generate and display an updated control image 150. The control image 150 may be displayed on either one of the shared display devices 11 and 13 on a steady basis, when transferred video are switched, and for a predetermined time period when any one of the users or the administrator gives an instruction.

Based on the queue, the video control unit 103 measures the elapsed time of the transferred video after the transferred video is switched, and notifies the video synthesis section 223 of the elapsed time. Upon completion of the allocated time of a user currently making a presentation, or when a change is instructed by the presenter or the administrator, the video control unit 103 refers to the FIFO memory 101 to instruct the video synthesis section 223 to output transferred video corresponding to next transferred video in the queue.

The video synthesis section 223 displays, on the shared display device 11, 13 the remaining allocated time of each presenter calculated from the elapsed time. The video control unit 103 may display the control image 150 on each of the client devices 51 to 61 so that the order of presentations or the allocated time can be changed on the touch screen of each client device.

[Control Image]

Figure 4:
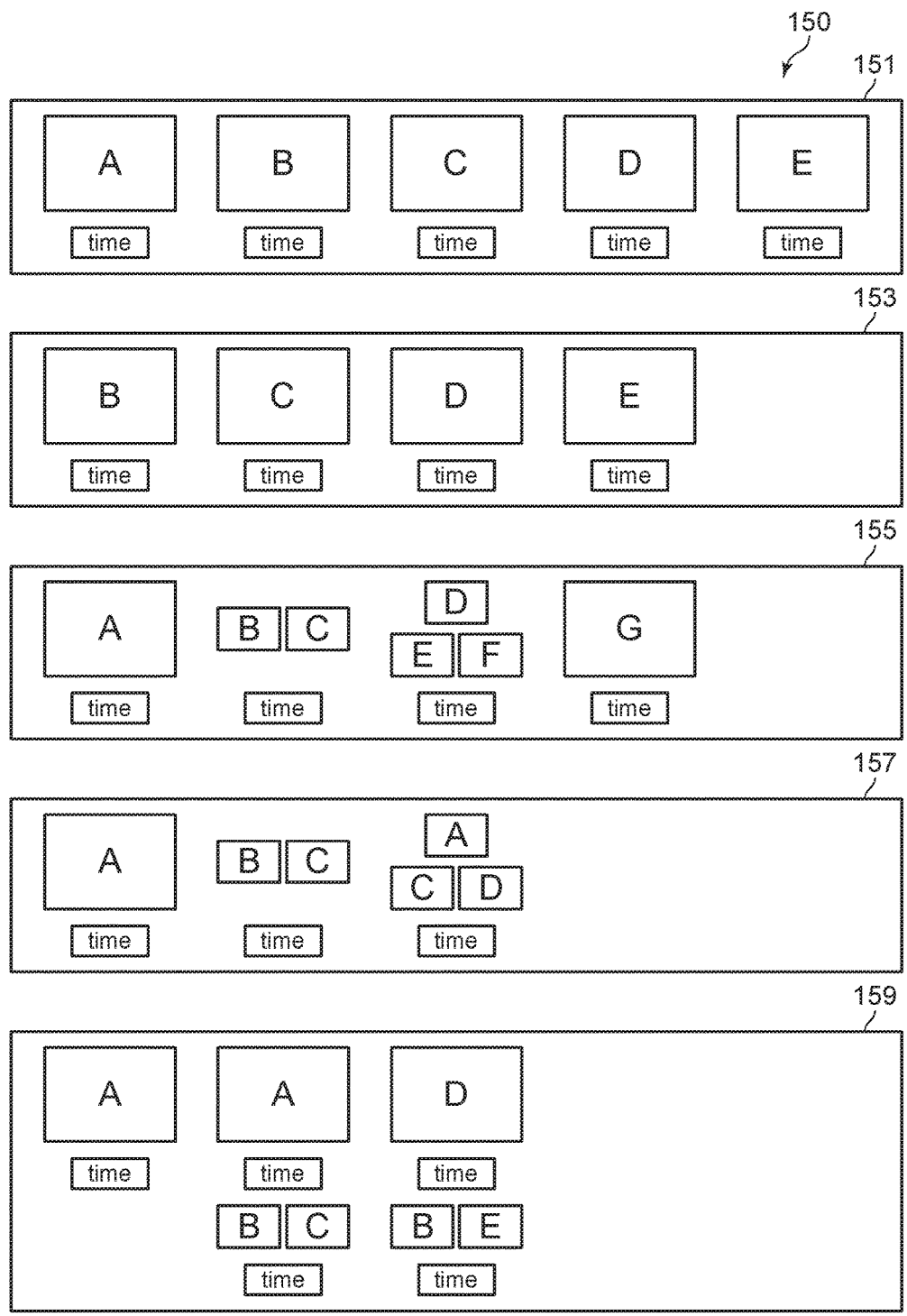
FIG. 4 is a diagram for describing examples of a control image 150.

FIG. 4 is a diagram for describing examples of the control image 150. The control image 150 corresponds to an image indicating the order of display of video data created from the queue in the FIFO memory 101 and the allocated time for presentation. Although the control image 150 may be configured by arranging the identifiers of the client devices 51 to 61, or the names or nicknames of the users in order, the control image 150 can also be configured by arranging desktop images being displayed on the client devices, respectively.

The first image in the control image corresponds to a transferred image, and subsequent images correspond to video data before being transferred. When the control image 150 is composed of desktop images, the user can determine the user's own order easily from the control image 150 even if the video control unit 103 cannot recognize the identifier of the client device 51 connected to the video capture card 111. Further, the participants in the conference can use the control image 150 to make it easy to grasp the flow of the conference and each participant's order.

A control image 151 indicates a state where video data A to E and corresponding allocated times are arranged sequentially in order of the queue. A control image 153 indicates a state when the display of transferred video A output from a client device responsible for the first presentation was finished. At this point of time, transferred video A is deleted from the queue in the FIFO memory 101.

Control images 155 to 159 indicate states when users viewing the control image 151 sent, from the client devices 51 to 61 and the input device 109, commands to change the display order, the display method, and the allocated times. The control image 155 indicates a state of displaying, on the shared display devices 11 and 13, video data A, video data B and C concurrently, video data D, E, and F concurrently, and video data G in this order while maintaining the display order of the control image 151.

When two or more transferred videos are displayed concurrently, the longest allocated time among those of the transferred videos, the allocated time of previous transferred video in the control image 151, or the allocated time designated by a user or the administrator can be adopted. The control image 157 indicates a state where the order in the control image 151 is changed by control commands from users and the administrator. The control image 159 indicates a state where video data to be displayed on the shared display device 11 and corresponding allocated times are arranged in order in the upper part, and video data to be displayed on the shared display device 13 and corresponding allocated times are arranged in order in the lower part.

[Image of Shared Display Device]

FIG. 5 illustrates examples of transferred video displayed on the shared display devices 11 and 13. FIG. 5A illustrates a state where transferred video A and the control image 151 are displayed on the shared display device 11 when the control image 151 is generated. FIG. 5B illustrates a state where transferred video B and a remaining allocated time 140 are displayed on the shared display device 11 when a user of transferred video B is making a presentation after the control image 153 is generated.

Figure 5A:
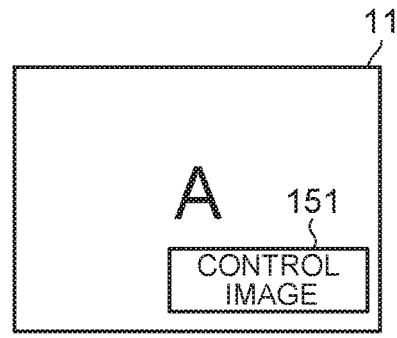
FIGS. 5A-5D are diagrams illustrating examples of transferred videos displayed on the shared display devices 11 and 13.
Figure 5B:
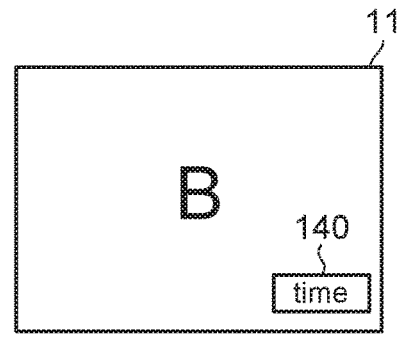
Figure 5C:
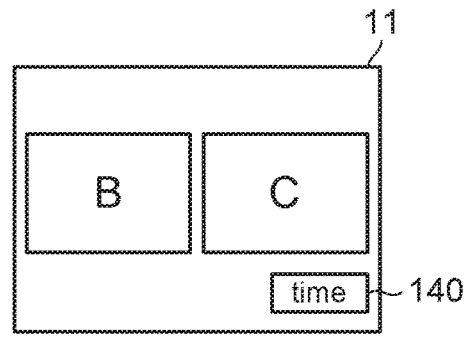

The video control unit 103 instructs the video synthesis section 223 to adjust the remaining allocated time 140 using the elapsed time measured after transferred video A is switched to transferred video B. FIG. 5C illustrates a state where transferred videos B and C, and the remaining allocated time 140 are displayed concurrently on the shared display device 11 when a user of the transferred video A completed the user's presentation after the control image 155 is generated.

Figure 5D:
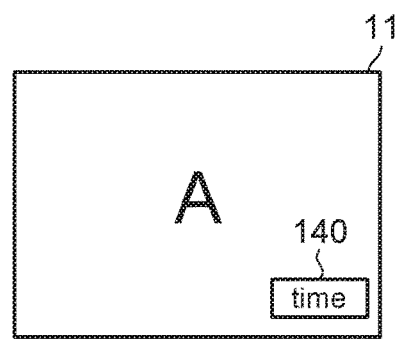
Figure 5D:
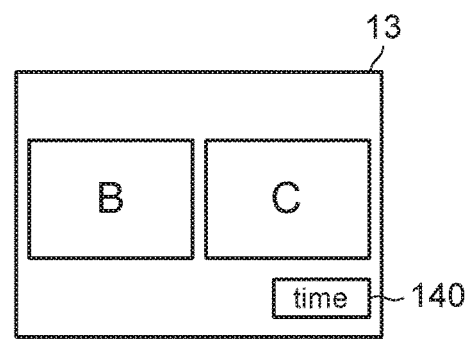

When the allocated time of transferred video B is up, the video control unit 103 can instruct the video synthesis section 223 to display, on the shared display device 11, an enlarged image of transferred video C and the allocated time thereof. FIG. 5D illustrates a state where transferred video A and the remaining allocated time 140 are displayed on the shared display device 11, and transferred videos B and C, and the remaining allocated time 140 of transferred video B are displayed concurrently on the shared display device 13 when the user of transferred video A completed the presentation after the control image 159 is generated.

[Operation Procedure]

Figure 6:
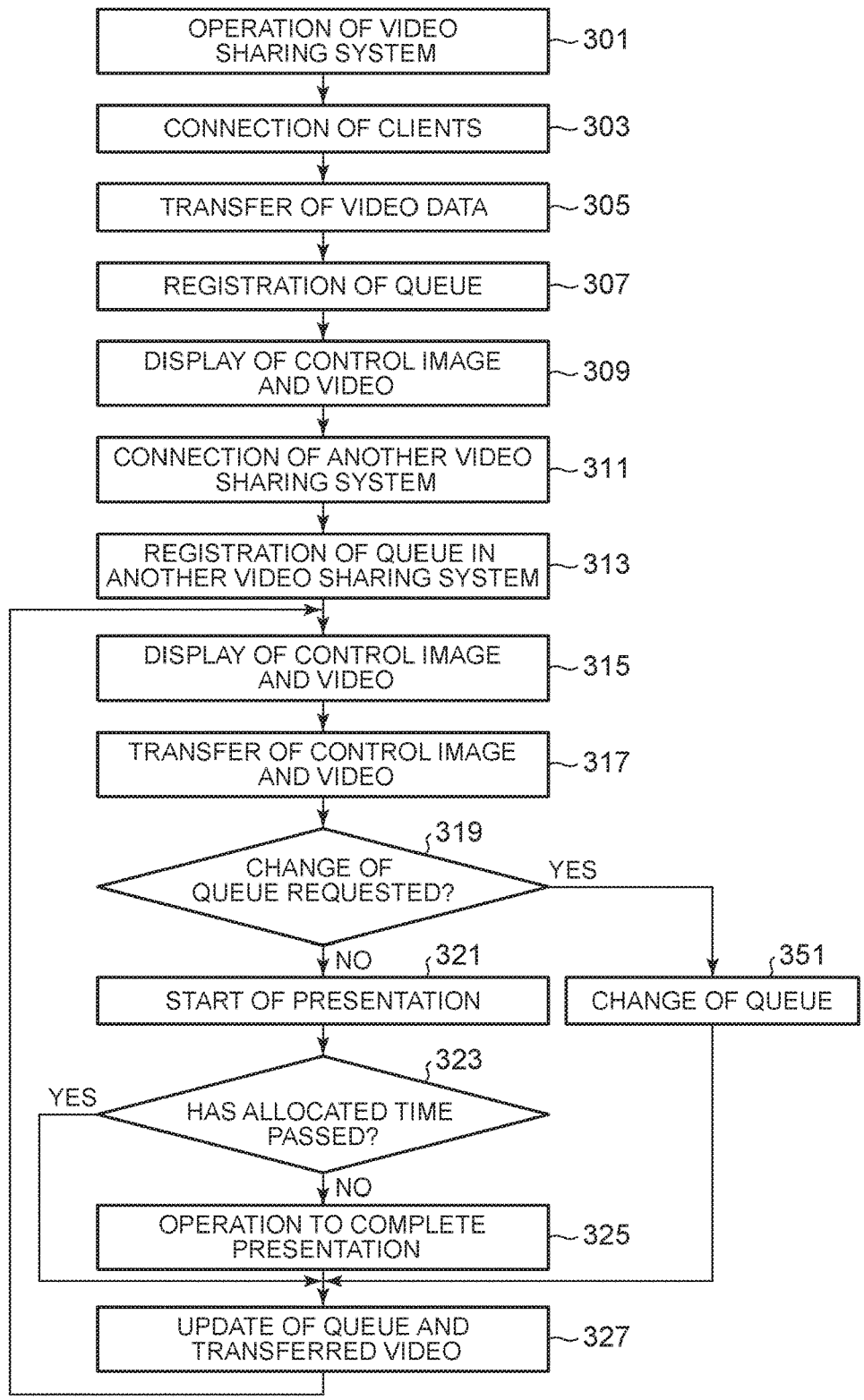
FIG. 6 is a flowchart for describing an operation procedure of the video sharing system 10.
Figure 7:
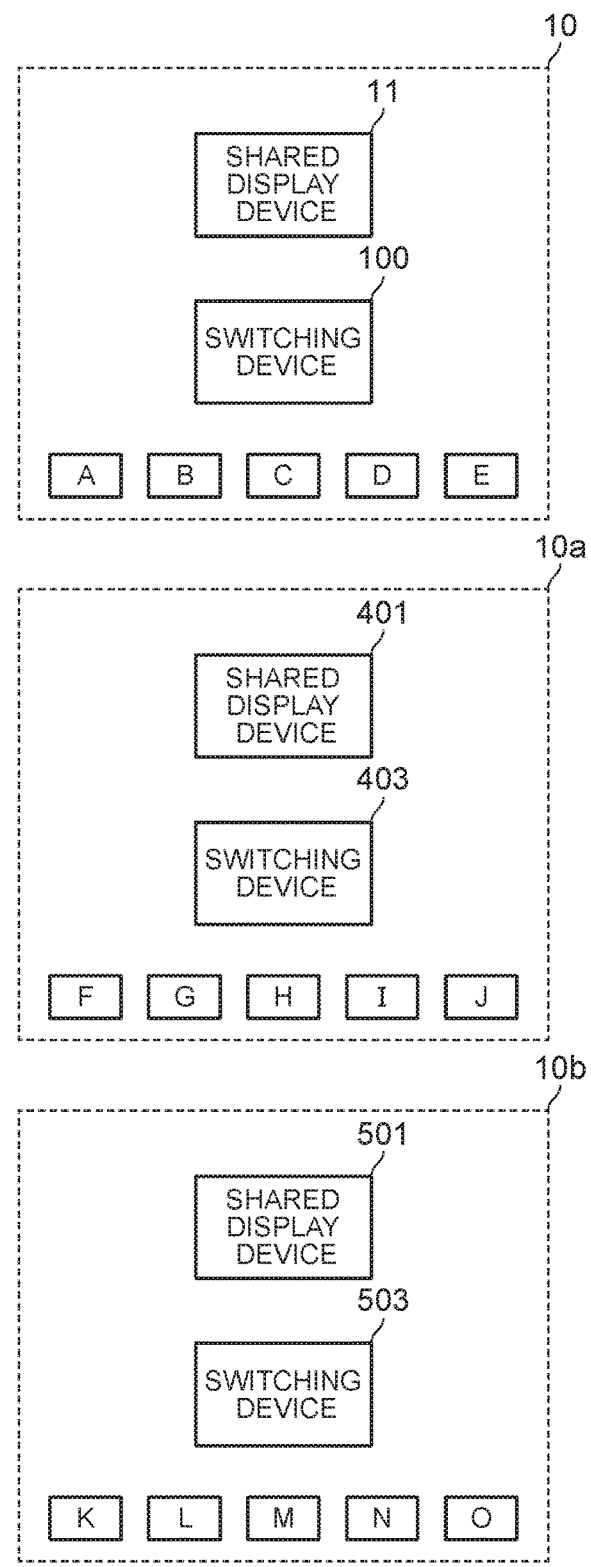
FIG. 7 is a diagram for describing an outline of the configurations of video sharing systems 10, 10a, and 10b.

FIG. 6 is a flowchart for describing an operation procedure of the video sharing system 10. FIG. 7 is a diagram for describing an outline of the configurations of the video sharing systems 10, 10a, and 10b. Here, it is assumed that client devices A to E are connected to the switching device 100 of the video sharing system 10, client devices F to J are connected to a switching device 403 of the video sharing system 10a, and client devices K to O are connected to a switching device 503 of the video sharing system 10b.

In an example, use of the switching device 100 as a master to control the order of display of video data on the shared display device 11 will be described. However, the switching devices 403, 503 can also be used as masters to control the order of display of video data on the shared display devices 401, 501, respectively. In block 301, the video sharing systems 10, 10a, and 10b are started up. Although the following description is made by mainly taking the operation of the video sharing system 10 as an example, the operation procedures of the video sharing systems 10a, 10b can also be understood in the same way.

In block 303, the client devices A to E are connected to the switching device 100 directly or via the network 15. At this point of time, a cable is connected to each connector or wireless association is established to put the client devices A to E into a state of being able to transfer image data, but it is assumed that any of the client devices A to E does not output video data yet. Similarly, in the video sharing systems 10a, 10b, the client devices F to J and the client devices K to O are connected to the switching devices 403, 503, respectively.

In block 305, it is assumed that the client devices A to E start the transfer of video data in order. As an example, the client devices A to E output video data in order of presentations. As another example, each of the client devices A to E can send a control command to the switching device 100 through a transmission channel of video data or another transmission channel to request the allocated time for each presentation and the order of the presentation, or either one of the allocated time and the order.

In block 307, the video control unit 103 registers, in the FIFO memory 101, a queue of the client devices A to E in order of receiving video data or in the order indicated by the control command. At this time, the video control unit 103 can register the queue by giving priority to the order indicated by the control command over the order of receiving video data.

Figure 8:
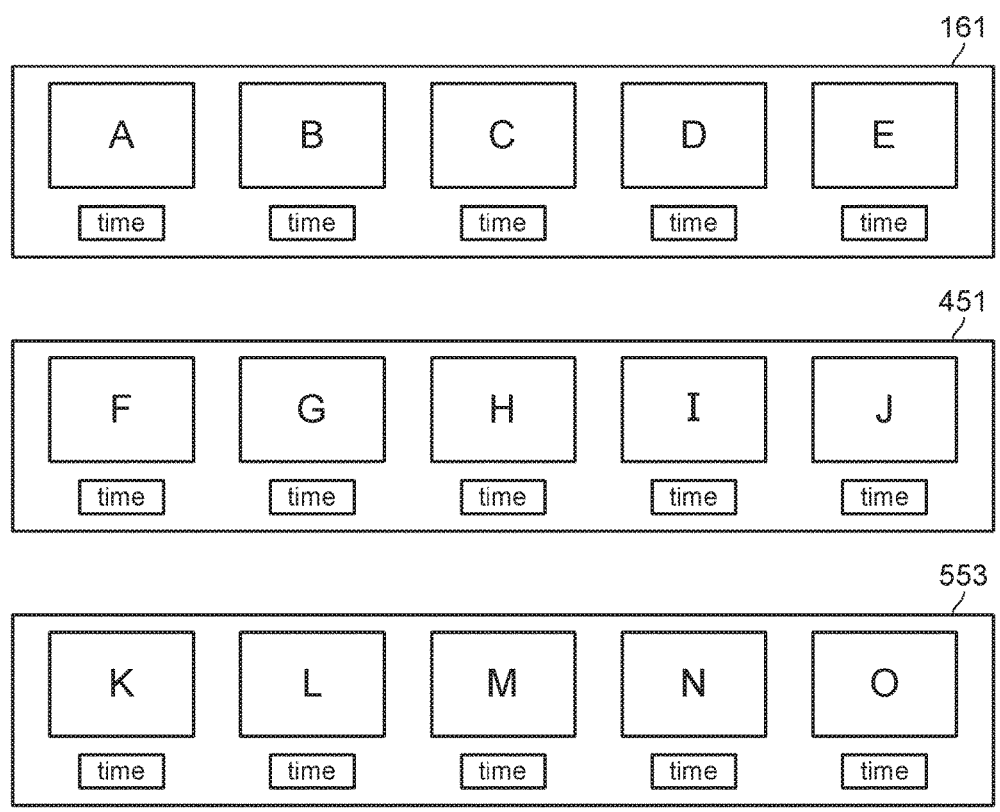
FIG. 8 is a diagram for describing an example of control images displayed respectively on the shared display devices 11, 401, and 501 before the switching devices 100, 403, and 503 are connected to one another.

In block 309, the video control unit 103 refers to the FIFO memory 101, and displays, on the shared display device 11, a control image 161 illustrated in FIG. 8 and transferred video A output from the first client device. Similarly, in the video sharing systems 10a, 10b, queues are registered in respective FIFO memories, and control images 451, 553 indicating the orders of client devices F to J, and K to O, and transferred videos F and K output from the first client devices F and K are displayed on the shared display devices 401 and 501, respectively.

In block 311, the switching devices 100, 403, and 503 are connected to one another. Here, it is assumed that the switching device 403 is first connected, and then the switching device 503 is connected. The switching devices 403 and 503 operate in the same layer as the client devices A to E in the video sharing system 10 to output video data displayed on the shared display devices 401 and 501 to the switching device 100, respectively. The display orders of the client devices F to J, and K to O on the shared display devices 401, 501 are controlled by the switching devices 403, 503, respectively.

The switching devices 403, 503 output, to the switching device 100, transferred videos F, K desired to be first displayed on the shared display device 11 in the order of the queues in the FIFO memories, respectively, and the control commands indicative of the allocated times and display orders requested as needed. When the switching devices 403, 503 are connected, the switching device 100 sends the switching devices 403, 503 transferred video being displayed on the shared display device 11. In block 305 to block 311, if the video control unit 103 displays an updated control image on the shared display devices 11, 401, and 501 each time video data and a control command is received from each of the client devices A to E and the switching devices 403, 503, the user seeing the display can send video data at appropriate timing to secure the user's order.

Figure 9:
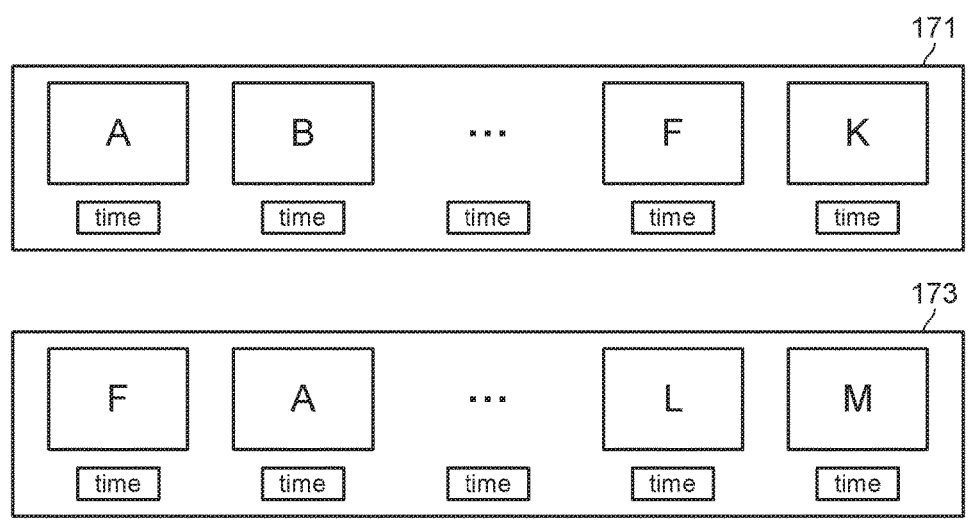
FIG. 9 is a diagram for describing an example of control images displayed respectively on the shared display devices 11, 401, and 501 when the switching devices 100, 403, and 503 are connected to one another.

In block 313, the video control unit 103 that received video data and control commands output from the switching devices 403, 503 through the LAN system input section 203 registers a queue in the FIFO memory 101. At this point of time, the switching device 100 can display, on the shared display device 11, transferred video A and a control image 171 illustrated in FIG. 9. In block 315, the video control unit 103 displays transferred video A and the control image 171 on the shared display device 11. In block 317, when the video control unit 103 transfers, to the switching devices 403, 503, transferred video A and the control image 171 being displayed on the shared display device 11 at the time, the same video data as those on the shared display device 11 are displayed on the shared display devices 401, 501.

In block 319, when any one of the client devices A to E and the switching devices 403, 503 requests the video control unit 103 to change the order of and allocated time for presentation, the procedure proceeds to block 351. In block 351, a request for a queue change is displayed on the shared display device 11. The administrator of the video sharing system 10 changes the order of the queue and the allocated time as needed, and the procedure proceeds to block 327. At this time, as an example, the switching device 100 displays a control image 173 (FIG. 9), in which video data F is changed to rise to the top position, on the shared display devices 11, 401, and 501 for a short time.

In block 321, the user of the client device A currently displaying transferred video A on the shared display device 11, 401, and 501 starts a presentation. The video control unit 103 measures the elapsed time after transferred video A is displayed, and instructs the video synthesis section 223 to display the remaining allocated time on the shared display device 11. In block 323, when the allocated time has passed, the procedure proceeds to block 327. In block 325, the presenter or the administrator performs an operation via the client device A or the input device 109 to complete the presentation before the end of the allocated time.

In block 327, the video control unit 103 instructs the video synthesis section 223 to update the queue, generate a control image, and select transferred video to be displayed next. After that, the procedure returns to block 315, and the video control unit 103 displays transferred video in the order of the queue to allow the next user to start a presentation. According to the above-described procedure, no one including the administrator is required to conduct an operation to switch the order of displaying video data on the shared display device once the order is registered in the queue, and this allows the users to concentrate on the conference. Further, since the allocated time is displayed on the shared display device 11, 13, the user can make a presentation with an awareness of the allocated time. In addition, a remote user can conduct an online conference without local user intervention while sharing the screen of the shared display device 11 with many local users.

While the present invention has been described so far with reference to the specific embodiment illustrated in the accompanying drawings, the present invention is not limited to the embodiment illustrated in the drawings. It goes without saying that any other known configuration can be adopted as long as the configuration has the effects of the present invention.

We claim:

1. A method in which a switching device displays, on a shared display device, video data output from a plurality of client devices, the method comprising:
   causing the switching device to receive video data from the plurality of client devices;
   causing the switching device to set an order of displaying a plurality of pieces of the video data on the shared display device; and
   causing the switching device to switch and display the video data on the shared display device according to the set order;
   causing the switching device to set an allocated time to be displayed on the shared display device for each piece of the video data;
   causing the switching device to measure time of displaying a predetermined piece of the video data; and
   causing the switching device to display a remaining allocated time on the shared display device,
   wherein displaying the video data includes at least switching the video data when the allocated time has passed.

2. The method according to claim 1, wherein the set order is an order of receiving the video data at the switching device.

3. The method according to claim 1, wherein the set order is an order designated by each of the client devices along with output of the video data.

4. The method according to claim 1, further comprising:
causing the switching device to display the set order on the shared display device; and
causing the switching device to change the set order according to an instruction from any one of the client devices.

5. The method according to claim 1, wherein the client devices include at least a distant client device connected through an online conferencing system.

6. The method according to claim 5, further comprising:
causing the switching device to send to the distant client device video data being displayed on the shared display device.

7. A method in which a switching device controls an order of video data to be displayed on a shared display device, the method comprising:
causing the switching device to receive video data from a plurality of client devices;
causing the switching device to set an order of presentations;
causing the switching device to determine completion of a predetermined presentation; and
causing the switching device to display next video data on the shared display device according to the set order;
causing the switching device to set an allocated time to be displayed on the shared display device for each piece of the video data;
causing the switching device to measure time of displaying a predetermined piece of the video data; and
causing the switching device to display a remaining allocated time on the shared display device,
wherein displaying the video data includes at least switching the video data when the allocated time has passed.

8. A switching device configured to transfer, to a shared display device, video data received from a plurality of client devices, the switching device comprising:
a storage unit which stores video data received from the plurality of client devices;
a registration unit which registers an order of transferring a plurality of pieces of the video data to the shared display device; and
a video control unit which outputs, to the shared display device, the video data extracted from the storage unit at a predetermined timing and in an order indicated by the registration unit, wherein
the switching device is configured to set an allocated time to be displayed on the shared display device for each piece of the video data, measure time of displaying a predetermined piece of the video data, display a remaining allocated time on the shared display device, and switch the video data when the allocated time has passed.

9. The switching device according to claim 8, wherein the registration unit is made up of a queue including at least identifiers of the client devices.

10. The switching device according to claim 9, wherein the queue includes at least an allocated time of displaying each piece of video data on the shared display device.

11. The switching device according to claim 9, wherein the video control unit displays, on the shared display device, a control image in which images corresponding to the identifiers are arranged in order of the queue.

12. The switching device according to claim 11, wherein each of the images corresponding to the identifiers is video data received from each client device.

13. The switching device according to claim 8, wherein the video control unit recognizes the predetermined timing when a client device currently displaying video data on the shared display device stops outputting the video data.

14. The switching device according to claim 9, further comprising:
a first video generation unit which processes video data in a video standard format,
a second video generation unit which processes video data in a LAN standard format, and
a third video generation unit which processes video data in a format received from a remote user through an online conferencing system.

15. The switching device according to claim 14, wherein the third video generation unit transfers, to a client device of the remote user, video data being displayed on the shared display device.

16. The switching device according to claim 15, wherein the third video generation unit transfers, to the client device of the remote user, a control image in which images corresponding to the identifiers are arranged in order of the queue.

* * * * *